United States Patent Office 3,706,804
Patented Dec. 19, 1972

3,706,804
QUATERNARY ALKYL ALIPHATIC KETONES
John B. Siddall, Palo Alto, Calif., assignor to Zoecon
Corporation, Palo Alto, Calif.
No Drawing. Continuation-in-part of applications Ser. No.
854,778, Sept. 2, 1969, and Ser. No. 879,620, Nov. 24,
1969. This application Jan. 27, 1970, Ser. No. 6,291
Int. Cl. C07c 49/20
U.S. Cl. 260—593 R                     19 Claims

ABSTRACT OF THE DISCLOSURE

Quaternary alkyl aliphatic hydrocarbon ketones prepared by reaction of acid with alkyl lithium useful as insect control agents and intermediates.

---

This is a continuation-in-part of application Ser. No. 854,778, filed Sept. 2, 1969 and application Ser. No. 879,620, filed Nov. 24, 1969.

This invention relates to methods and compositions for the control of insects and to novel quaternary alkyl carbonyl compounds of the following Formula A:

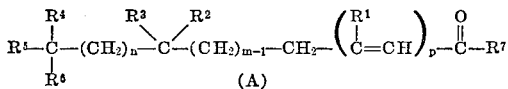

(A)

wherein, $m$ is an integer of one to six;
$n$ is an integer of two to six;
$p$ is zero or the integer one;
$R^2$ is hydrogen or alkyl;
each of $R^1$, $R^3$, $R^4$, $R^5$ and $R^6$ is alkyl; and
$R^7$ is hydrogen or lower alkyl.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. When "alkyl" is modified by the term "lower" herein, the chain length of the alkyl group is one to six carbon atoms.

The present invention provides a novel method for the control of insects which comprises treating the insects with an effective amount of a compound of Formula A. To aid in achieving the uniform and economical application, it is advantageous to employ a composition comprising an inert carrier and a compound of Formula A. These compositions can be either liquid or solid. The exact formulation employed will vary according to factors, such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary role or mechanism of treating the insects—that is, topical application (absorption), per oral application (ingestion), chemosterilant (sterility) or vaporization (inhalation). The primary role of treating insects is, in turn, dependent on whether the insect is a chewing insect, a sucking insect or flying insect; whether the control of the insect is sought at the embryo, larvae, pupae or adult stage; and the locus of the insect.

Formulations can be prepared by incorporating a compound of Formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable and mineral oils conventionally employed as carriers in formulations for insect control. Other components can be included, such as emulsifying agents, wetting agents and dispersing agents. Generally, the formulation will contain less than 95% by weight of the compound and more frequently less than 25%. Depending upon the particular insect being treated and the particular stage of the life cycle at the time of treatment, control of insects by treating the insects with a compound of Formula A is accomplished by the compound's ability to: inhibit metamorphosis; act as a direct insecticide, particularly at the embryo stage; act as a chemosterilant; or break the diapause of the insect.

Treatment of insects by vapor action can be accomplished, for example, by formulating a compound of Formula A with a resinous material, such as the vinyl polymers, e.g. polyvinyl chloride. This method is particularly useful for flying insects and treating enclosed areas. Suitable formulating methods and carriers are described in U.S. Patent 3,318,769, for example.

Although not intending to be limited by a theoretical explanation, it appears that the effectiveness of the compounds of Formula A can be traced to their ability to mimic the activity of juvenile hormone substances. Juvenile hormone was identified as methyl 10,11-oxido-7-ethyl-3,11-trimethyltrideca-2,6-dienoate using an extract of Cecropia moths by Roeller et al., Angew. Chem. internat. Edit., 6, 179 (1967) and Chemical & Engineering News, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones From the Cecropia Silk Moth," Zoology (Proc. N.A.S.) 60, 853 (1968). In addition to the natural juvenile hormones, some synthetic terpenoids have been reported exhibiting maturation inhibiting, sterility or ovicidal activity. U.S. Pats. 3,429,-970 and 3,453,362 and Schwarz et al., "Activity of Selected Terpenoid Compounds," Science, 167, 191 (January 1970).

In the application of the compounds of Formula A, it is more economical and expedient to use a mixture of isomers to avoid separation processing. As individual isomers, the trans isomer is preferably employed for the control of insects.

Typical insects which can be controlled by treatment with a compound of Formula A in accordance with the present invention are *Dysdercus cingulatus*, *Tenebrio molitor*, *Galleria mellonella*, *Tribolium confusm*, *Periplaneta americana*, *Hypera puctata* (clover leaf weevil), *Dysdercus suturellus*, Aphididae, such as melon aphid and cabbage aphid, *Tinea pellionella*, *Sitophilus granarius*, *Lygus hesperus*, *Schistocerca vaga* and *Pyrrhocoris apterus*.

In the description hereinafter, each of $R^1$, $R^2$, $R^3$, $R^4$, $R^5$, $R^6$, $m$, $n$ and $p$ is as defined hereinabove.

The compounds of Formula A wherein R⁷ is lower alkyl are prepared according to the following transformation:

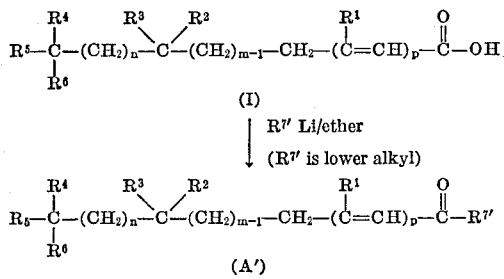

In the practice of the above process, an acid of Formula I is reacted with a lower alkyl lithium in an ether solvent, such as ether, tetrahydrofuran, and the like. The reaction is conducted at a temperature of from about room temperature to $-10°$ C., although higher or lower temperatures can be used. Generally, a temperature of from about $20°$ C. to about $0°$ C. is used. The reaction is generally complete in from about 0.5 hours to 24 hours depending on the reaction temperature used and the reactivity of the lower alkyl lithium being used. The progress of the reaction can be followed by thin layer chromatography.

The compounds of Formula A wherein $R^7$ is hydrogen are prepared by oxidation of the corresponding alcohol (II) as represented below:

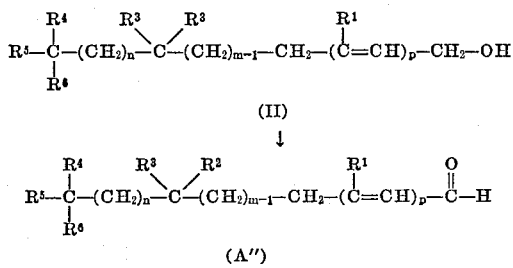

In the practice of the above process, a C–1 alcohol of Formula II is oxidized using chromic acid, manganese dioxide, and the like, to yield the novel aldehydes (A″). The oxidation can be carried out using the procedures described by Burrell et al., J. Chem. Soc. (C), 2144–2154 (1966), Weedon et al., J. Chem. Soc., 2687 (1951), or Helv. Chim. Acta, 32, 1356 (1949). The aldehydes (A″) can also be prepared from the C–1 halide (chloro or bromo) otherwise corresponding to Formula II using the method of U.S. Pat. 2,902,515.

The compounds of Formulas A′ and A″, especially when $p$ is zero, are also useful lubricants, plasticizers for hydrocarbon polymers and chemical intermediates for the synthesis of $\alpha,\beta$-unsaturated esters, acids and amides which are useful in insect control. The compounds of Formulas A′ and A″, also find application in the perfumery industry because of their odor characteristics and as intermediates for odorants and epoxides which can be polymerized into resins for adhesives, coatings and casting applications.

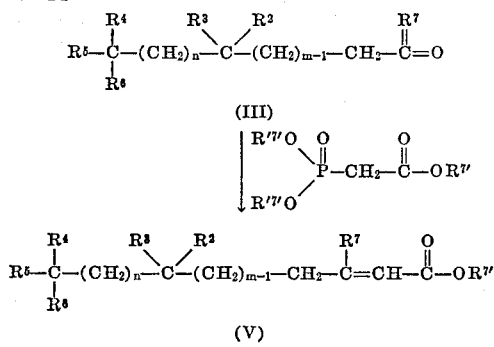

The above conversion is conducted in an organic solvent, such as dimethylformamide, benzene, dimethylsulfoxide or toluene with a base such as sodium hydride, sodium methylate, and the like, as proton acceptor in known manner, such as described in U.S. Pat. 3,177,226.

The acids of Formula I and the alcohols of Formula II are prepared according to methods fully described in my application Ser. No. 854,778, filed Sept. 2, 1969, now U.S. Pat. 3,649,590 and my application Ser. No. 879,620, filed Nov. 24, 1969, the disclosures of which are hereby incorporated by reference. For example, the acids (I; $p$ is one) are prepared by alkylation of an $\alpha,\beta$-acetylenic ester ($R^1$—C≡C—COOAlkyl using an organo-copper reagent wherein the organo group is prepared from

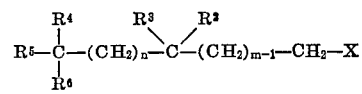

(X is chloro or bromo) to form

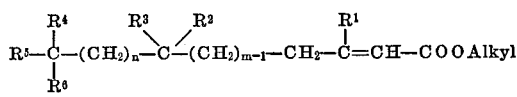

which is hydrolyzed by treatment with base to the free acid (I) and reduced by treatment with lithium aluminum hydride or the like to the alcohol (II).

The following examples set forth detailed procedures for the preparation of the compounds of the present invention and serve to illustrate the synthesis thereof. Temperature in degrees centigrade.

EXAMPLE 1

(A) To a stirred solution of 2.5 g. of 3,7,7,11,11-pentamethyldodec-2-enoic acid in 30 ml. of dry ether is added slowly, at $0°$, 21 ml. of a one molar solution of methyl lithium in ether. After three hours at $20°$ the mixture is poured into iced 1 N hydrochloric acid (100 ml.) with vigorous stirring. The ether layer is separated, combined with ethereal washings of the aqueous phase, washed with water, saturated potassium bicarbonate and then saturated brine, dried over magnesium sulfate and concentrated under reduced pressure to yield 4,8,8,12,12-pentamethyltridec-3-en-2-one which is purified by high vacuum distillation or chromatography.

(B) The process of Part A is repeated with the exception of using an equivalent amount of each of the acids listed in Column I to yield the corresponding methyl ketone litsed in Column II.

Column I 3-ethyl-7,7,11,11-tetramethyldodec-2-enoic acid,
7-ethyl-3,7,10,10-tetramethylundec-2-enoic acid,
3,6,6,10,10-pentamethylundec-2-enoic acid,
3,5,5,9,9-pentamethyldec-2-enoic acid,
3,7,7,10,10-pentamethylundec-2-enoic acid,
3-ethyl-7,7,10,10-tetramethylundec-2-enoic acid,
3,7,7,11,11-pentamethyltridec-2-enoic acid,
3,7,7,11-tetramethyl-11-ethyltridec-2-enoic acid,
3,7,7-trimethyl-11,11-diethyltridec-2-enoic acid,
3,7,7-trimethyl-11,11-diethyltetradec-2-enoic acid,
3,7,7,11-tetramethyl-11-(n-propyl)tetradec-2-enoic acid,
3,7,7-trimethyl-11-ethyl-11-(n-propyl)tetradec-2-enoic acid,
3,7,7,11,11-pentamethylpentadec-2-enoic acid,
3-ethyl-7,7,11,11-tetramethyltridec-2-enoic acid,
3,7,10,10-tetramethyl-7-ethyldodec-2-enoic acid,
3,7,10-trimethyl-7,10-diethyldodec-2-enoic acid,
3,7,7,10,10-pentamethyldodec-2-enoic acid,
3,7,7,10-tetramethyl-10-ethyldodec-2-enoic acid,
3,7,7,12,12-pentamethyltridec-2-enoic acid,
3,8,8,13,13-pentamethyltetradec-2-enoic acid,
3,7,10,10-tetramethylundec-2-enoic acid,
3,7,11,11-tetramethyldodec-2-enoic acid,
3,7,10,10-tetramethyldodec-2-enoic acid, 3,10,10-trimethyl-7-ethyldodec-2-enoic acid,
3,7,11,11-tetramethyltridec-2-enoic acid,
3-ethyl-7,11,11-trimethyltridec-2-enoic acid,
3,7-diethyl-10,10-dimethyldodec-2-enoic acid,
3-ethyl-7,10,10-trimethyldodec-2-enoic acid,
3,11,11-trimethyl-7-ethyltridec-2-enoic acid,
3,7,11,11-tetramethyl-7-ethyltridec-2-enoic acid.

Column II 4-ethyl-8,8,12,12-tetramethyltridec-3-en-2-one,
8-ethyl-4,8,11,11-tetramethyldodec-3-en-2-one,
4,7,7,11,11-pentamethyldodec-3-en-2-one,
4,6,6,10,10-pentamethylundec-3-en-2-one,
4,8,8,11,11-pentamethyldodec-3-en-2-one,
4-ethyl-8,8,11,11-tetramethyldodec-3-en-2-one,
4,8,8,12,12-pentamethyltetradec-3-en-2-one,
4,8,8,12-tetramethyl-12-ethyltetradec-3-en-2-one,
4,8,8-trimethyl-12,12-diethyltetradec-3-en-2-one,
4,8,8-trimethyl-12,12-diethylpentadec-3-en-2-one,
4,8,8,12-tetramethyl-12-(n-propyl)pentadec-3-en-2-one,
4,8,8-trimethyl-12-ethyl-12-(n-propyl)pentadec-3-en-2-one,
4,8,8,12,12-pentamethylhexadec-3-en-2-one,
4-ethyl-8,8,12,12-tetramethyltetradec-3-en-2-one,
4,8,11,11-tetramethyl-8-ethyltridec-3-en-2-one,
4,8,11-trimethyl-8,11-diethyltridec-3-en-2-one,
4,8,8,11,11-pentamethyltridec-3-en-2-one,
4,8,8,11-tetramethyl-11-ethyltridec-3-en-2-one,
4,8,8,13,13-pentamethyltetradec-3-en-2-one,
4,9,9,14,14-pentamethylpentadec-3-en-2-one,
4,8,11,11-tetramethyldodec-3-en-2-one,
4,8,12,12-tetramethyltridec-3-en-2-one,
4,8,11,11-tetramethyltridec-3-en-2-one,
4,11,11-trimethyl-8-ethyltridec-3-en-2-one,
4,8,12,12-tetramethyltetradec-3-en-2-one,
4-ethyl-8,12,12-trimethyltetradec-3-en-2-one,
4,8-diethyl-11,11-dimethyltridec-3-en-2-one,
4-ethyl-8,11,11-trimethyltridec-3-en-2-one,
4,12,12-trimethyl-8-ethyltetradec-3-en-2-one,
4,8,12,12-tetramethyl-8-ethyltetradec-3-en-2-one.

EXAMPLE 2

The process of Example 1 (Part A) is repeated with the exception of using an equivalent amount of each of ethyl lithium, n-butyl lithium, n-propyl lithium, i-propyl lithium and t-butyl lithium in place of methyl lithium to yield 5,9,9,13,13-pentamethyltetradec-4-en-3-one, 7,11,11,15,15-pentamethylhexadec-6-en-5-one, 6,10,10,14,14-pentamethylpentadec - 5-en-4-one, 2,5,9,9,13,13-hexamethyltetradec-4-en-3-one and 2,2,5,9,9,13,13-heptamethyltetradec-4-en-3-one, respectively.

Each of 3,7,11,11-tetramethyldodec-2-enoic acid, 3,11,11 - trimethyl-7-ethyltridec-2-enoic acid, 3,7,11,11-tetramethyltridec - 2-enoic acid, 3,7,11,11-tetramethyl-7-ethyltridec - 2-enoic acid and 3,7,7,11,11-pentamethyltridec-2-enoic acid is reacted with ethyl lithium using the method of Example 1 (Part A) to yield 5,9,13,13-tetramethyltetradec - 4-en-3-one, 5,13,13-trimethyl-9-ethylpentadec-4-en - 3-one, 5,9,13,13-tetramethylpentadec-4-en-3-one, 5,9,13,13 - tetramethyl-9-ethylpentadec-4-en-3-one and 5,9,9,13,13-pentamethylpentadec-4-en-3-one, respectively.

EXAMPLE 3

(A) A mixture of 2 g. of 3,7,7,11,11-pentamethyldodec-2-en-1-ol, 10 g. of manganese dioxide and 30 ml. of methylene chloride is prepared by the slow addition of manganese dioxide so that the temperature does not exceed about 30°. The mixture is then shaken for 50 hours in an atmosphere of nitrogen at room temperature. The mixture is then filtered and the solid washed with ether. The filtrate and washings are combined and evaporated under reduced pressure to yield the aldehyde (i.e. 3,7,7,11,11-pentamethyldodec-2-en-1-al) which can be purified by distillation or chromatography.

(B) The process of Part A is repeated with the exception of using an equivalent amount of 3,7,11,11-tetramethyldodec-2-en-1-ol,
3,11,11-trimethyl-7-ethyltridec-2-en-1-ol,
3,7,11,11-tetramethyltridec-2-en-1-ol,
3,7,11,11-tetramethyl-7-ethyltridec-2-en-1-ol and
3,7,7,11,11-pentamethyltridec-2-en-1-ol as the starting material to yield 3,7,11,11-tetramethyldodec-2-en-1-al,
3,11,11-trimethyl-7-ethyltridec-2-en-1-al,
3,7,11,11-tetramethyltridec-2-en-1-al,
3,7,11,11-tetramethyl-7-ethyltridec-2-en-1-al and
3,7,7,11,11-pentamethyltridec-2-en-1-al, respectively.

(C) Using the method of Part A each of 4-ethyl-4,7,7-trimethyloctan-1-ol,
4,4,8,8-tetramethylnonan-1-ol,
3,3,7,7-tetramethyloctan-1-ol,
4,4,7,7-tetramethyloctan-1-ol,
4,4,8,8-tetramethyldecan-1-ol,
4,7,7-trimethyl-4-ethylnonan-1-ol,
4-ethyl-7,7-dimethylnonan-1-ol,
4,8,8-trimethyldecan-1-ol,
4,4,9,9-tetramethyldecan-1-ol,
4,4,7-trimethyl-7-ethylnonan-1-ol,
4-ethyl-4,8,8-trimethyldecan-1-ol and
2,2,6,6-tetramethylheptan-1-ol are oxidized to the corresponding aldehyde, i.e.

4-ethyl-4,7,7-trimethyloctan-1-al,
4,4,8,8-tetramethylnonan-1-al,
3,3,7,7-tetramethyloctan-1-al,
4,4,7,7-tetramethyloctan-1-al,
4,4,8,8-tetramethydecan-1-al,
4,7,7-trimethyl-4-ethylnonan-1-al,
4-ethyl-7,7-dimethylnonan-1-al,
4,8,8-trimethyldecan-1-al,
4,4,9,9-tetramethyldecan-1-al,
4,4,7-trimethyl-7-ethylnonan-1-al,
4-ethyl-4,8,8-trimethyldecan-1-al and
2,2,6,6-tetramethyl-heptan-1-al, respectively.

Alternatively, the saturated alcohols can be converted into the aldehyde by controlled oxidation with a solution of potassium dichromate in dilute sulfuric acid.

(D) A mixture of 11.2 g. of diethyl carbethoxymethylphosphonate in 100 ml. of dimethylformamide is treated with 2.4 g. of sodium hydride. The mixture is stirred until the evolution of gas ceases and then 7.0 g. of 4,4,8,8-tetramethyldecan-1-al is added slowly with stirring, maintaining a temperature below 30°. The mixture is stirred for about one hour, then diluted with water and then extracted with ether. The ethereal extracts are washed with water, dried over sodium sulfate and evaporated under reduced pressure to yield ethyl 6,6,10,10-tetramethyldodec - 2-enoate which is purified by chromatography.

Using the foregoing procedure, the other aldehydes described herein are converted into the corresponding C-2,3 unsaturated alkyl esters, e.g. 5,5,10,10-tetramethylundecan-1-al is converted into ethyl 7,7,12,12-tetramethyltridec-2-enoate and 5,5,9,9 - tetramethylundecan-1-al. is converted into ethyl 7,7,11,11-tetramethyltridec-2-enoate.

EXAMPLE 4

The unsaturated alcohols of Formula II ($p$ is one), when subjected to ozonolysis, afford the ketones of Formula A' wherein $p$ is zero and $R^{7'}$ is lower alkyl. The ozonolysis is carried out according to the procedures of Fischer, Annalen 464, 69 (1928) and Karrer et al., Helv. Chim. Acta, 26, 1741 (1943). Using partial formulas, the conversion is illustrated as follows:

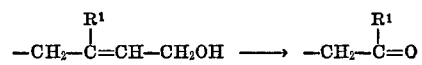

A stream of ozonized oxygen is passed into a cooled (0° C.) solution of 3,7,7,11,11-pentamethyldodec-2-en-1-ol (5.5 g.) in 70 ml. of acetic acid and 15 ml. of methyl acetate until absorption of ozone ceases. The methyl acetate is evaporated under reduced pressure and hydrogen peroxide (20 ml.) is added. The mixture is kept at about 35° for 48 hours and then poured into water. Extraction with ether affords 6,6,10,10-tetramethylundecan-2-one which can be purified by chromatography or via formation of the semicarbazone, crystallization and hydrolysis with acid.

By use of the foregoing procedure, other unsaturated alcohols of Formula II in which $p$ is one, see for example, Example 3 (Part B), are converted into the corresponding ketone, e.g. 3,7,11,11-tetramethyldodec-2-en - 1 - ol, 3,11,11-trimethyl-7-ethyltridec-2-en-1-ol, 3,7,11,11 - tetramethyl-7-ethyltridec-2-en-1-ol and 3,7,7,11,11-pentamethyltridec-2-en-1-ol yield 6,10,10 - trimethylundecan-2-one, 6-ethyl-10,10-dimethyldodecan-2-one, 6 - ethyl-6,10,10-trimethyldodecan-2-one and 6,6,10,10-tetramethyldodecan-2-one, respectively.

What is claimed is:

1. A compound selected from those of Formula A:

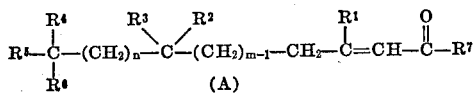

(A)

wherein, $m$ is an integer of one to six;
$n$ is an integer of two to six;
$R^2$ is hydrogen or lower alkyl;
each of $R^1$, $R^3$, $R^4$, $R^5$ and $R^6$ is lower alkyl; and
$R^7$ is lower alkyl.

2. A compound according to claim 1 wherein $m$ is an integer of one to four; $n$ is an integer of two to four; and each of $R^1$, $R^2$, $R^3$, $R^4$, $R^5$ and $R^6$ is lower alkyl.

3. A compound according to claim 1 wherein $m$ is an integer of one to four; $n$ is an integer of two to four; each of $R^1$, $R^3$, $R^4$, $R^5$ and $R^6$ is lower alkyl and $R^2$ is hydrogen.

4. A compound according to claim 2 wherein each of $R^1$, $R^2$, $R^3$, $R^4$, $R^5$, $R^6$ and $R^7$ is methyl or ethyl.

5. A compound according to claim 3 wherein each of $R^1$, $R^3$, $R^4$, $R^5$, $R^6$ and $R^7$ is methyl or ethyl.

6. A compound according to claim 1 wherein $m$ is three; $n$ is three; $R^2$ is hydrogen; and each of $R^1$, $R^3$, $R^4$, $R^5$ and $R^6$ is methyl.

7. A compound according to claim 8 wherein $R^7$ is methyl or ethyl.

8. A compound according to claim 1 wherein $m$ is three; $n$ is three; $R^2$ is hydrogen; each of $R^1$, $R^4$ and $R^6$ is methyl; and each of $R^3$ and $R^5$ is ethyl.

9. A compound according to claim 8 wherein $R^7$ is methyl or ethyl.

10. A compound according to claim 1 wherein $m$ is three; $n$ is three; $R^2$ is hydrogen; each of $R^1$, $R^3$, $R^4$ and $R^6$ is methyl; and $R^5$ is ethyl.

11. A compound according to claim 10 wherein $R^7$ is methyl or ethyl.

12. A compound according to claim 1 wherein $m$ is three; $n$ is three; and each of $R^1$, $R^2$, $R^3$, $R^4$, $R^5$ and $R^6$ is methyl.

13. A compound according to claim 12 wherein $R^7$ is methyl or ethyl.

14. A compound according to claim 1 wherein $m$ is three; $n$ is three; each of $R^1$, $R^2$, $R^4$ and $R^6$ is methyl; and each of $R^3$ and $R^5$ is ethyl.

15. A compound according to claim 14 wherein $R^7$ is methyl or ethyl.

16. A compound according to claim 1 wherein $m$ is three; $n$ is three; each of $R^1$, $R^2$, $R^3$, $R^4$ and $R^6$ is methyl; and $R^5$ is ethyl.

17. A compound according to claim 16 wherein $R^7$ is methyl or ethyl.

18. A compound according to claim 1 wherein $R^1$ is methyl; $R^2$ is hydrogen or methyl; each of $R^3$, $R^4$, $R^5$ and $R^6$ is methyl or ethyl; and $m$ is two or three and $n$ is two or three.

19. A compound according to claim 18 wherein $R^7$ is methyl or ethyl.

References Cited

UNITED STATES PATENTS 2,783,257   2/1957   Surmatis et al. _____ 260—593

BERNARD HELFIN, Primary Examiner

L. B. DeCRESCENTE, Asssitant Examiner

U.S. Cl. X.R.

260—526 R, 526 N, 601 R, 632 R; 424—331